United States Patent

Siemetzki

[15] 3,645,582
[45] Feb. 29, 1972

[54] PROCESS AND APPARATUS FOR FEEDING SOLID PARTICLES UNDER VACUUM

[72] Inventor: Hans Siemetzki, Bechhausen, Germany
[73] Assignee: Barmag Barmer Maschinenfabrik Aktiengesellschaft, Wuppertal, Germany
[22] Filed: Nov. 16, 1970
[21] Appl. No.: 89,903

[30] Foreign Application Priority Data

Nov. 25, 1969 Germany.....................P 19 59 015.9

[52] U.S. Cl..................................302/35, 302/42, 302/55, 302/62
[51] Int. Cl..............B65g 53/50, B65g 53/60, B65g 53/66
[58] Field of Search................222/373; 302/21, 35, 42, 48, 302/50, 51, 53, 55, 57, 59, 62

[56] References Cited

UNITED STATES PATENTS

| | | |
|---|---|---|
| 2,410,309 | 10/1946 | Simpson et al...........................302/53 |
| 2,413,479 | 12/1946 | Wiegand.................................302/53 |
| 3,489,464 | 1/1970 | Delfs....................................302/42 X |

FOREIGN PATENTS OR APPLICATIONS

| | | |
|---|---|---|
| 924,328 | 4/1963 | England.................................302/59 |

*Primary Examiner*—Richard E. Aegerter
*Assistant Examiner*—W. Scott Carson
*Attorney*—Johnston, Root, O'Keeffe, Keil, Thompson & Shurtleff

[57] ABSTRACT

A process and apparatus for feeding a particulate solid material, especially a pulverulent or granular thermoplastic material by gravity flow under vacuum into the feed chamber of a continuously operated screw extruder or similar processing apparatus, the apparatus including a single supply container from which the solid material flows into said feed chamber and to which additional solid material is conducted through a signal operated valve which is automatically opened and closed in response to the minimum level of material in the container and the maximum gas pressure in the container, respectively.

7 Claims, 1 Drawing Figure

Patented Feb. 29, 1972
3,645,582
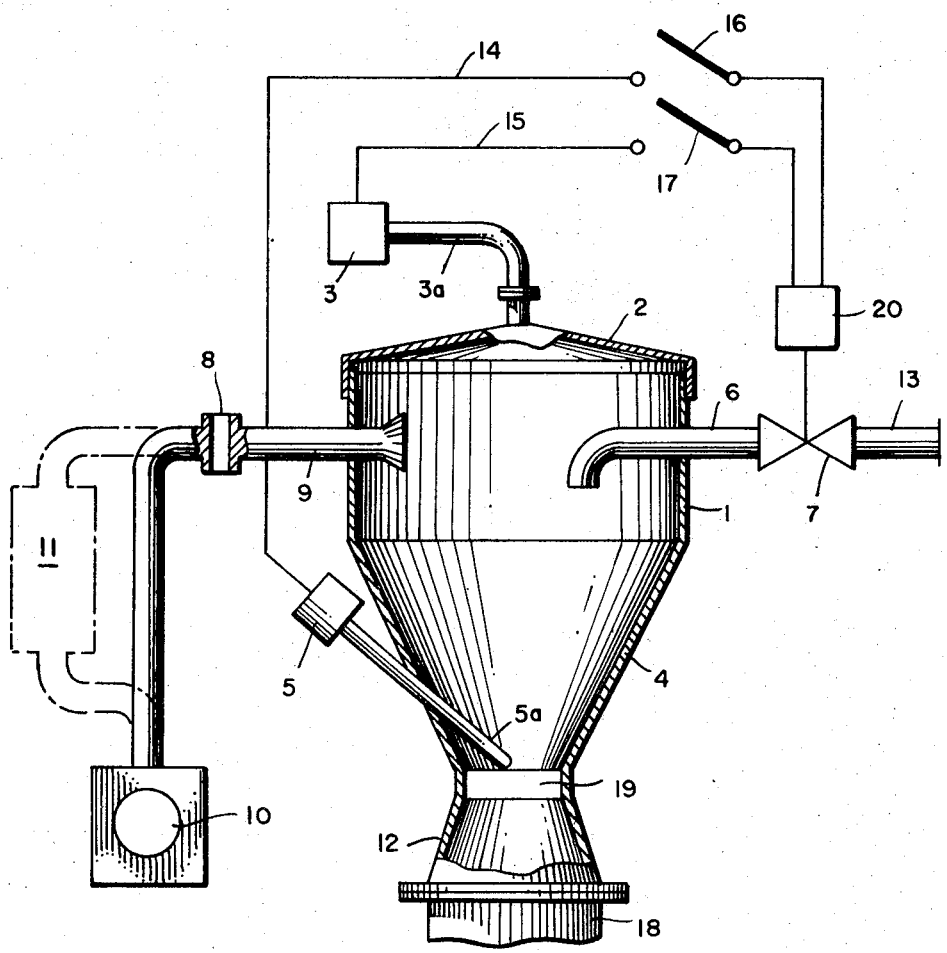
INVENTOR:
HANS SIEMETSKI
BY
Johnston, Root, O'Keeffe, Keil, Thompson & Shurtleff
ATT'YS

PROCESS AND APPARATUS FOR FEEDING SOLID PARTICLES UNDER VACUUM

In the operation of certain processing equipment, especially screw extruders, it is necessary to continuously feed a pulverulent, granular or similarly finely divided solid material into an evacuated feed zone of the processing equipment. For example, in the use of conventional screw extruders, thermoplastic granules or particles are introduced into the evacuated portion of the screw cylinder from a large supply container or feed hopper in which the feed is present under substantially atmospheric pressure. It has been necessary for this supply of solid material to flow through a number of chambers and pressure stages arranged sequentially one after the other until the working vacuum of the screw extruder itself is achieved. Each individual pressure chamber or vessel is coupled by an exhaust conduit to a vacuum pump. Since the solid granules or particles are ordinarily conveyed by gravity or free-fall, the sequence of pressure chambers are arranged one above the other and are hermetically sealed on both sides by gate valves or outlet valves. By means of this stepwise reduction of pressure from one chamber to the next, it is possible to achieve a quasiconstant reduced pressure in the entry or feed zone of the screw extruder.

However, the above-described cascade or sequential coupling of the individual pressure vessels or chambers makes it difficult to regulate the feed of the solid particles, because the pressure and degree of filling in each chamber must be controlled while being interdependent upon the next adjacent pressure chamber. Moreover, by reason of the interposed gate valve between pressure chambers, disturbances in the operation are easily produced. Such disturbances arise on the one hand from the difficulty of resealing or closing the valve after the pulverulent or granular material has flowed therethrough, and on the other hand, from the possible fouling of the highly sensitive materials in the lubricated portions of the valves.

One apparatus for transporting or feeding such materials under a vacuum and having three pressure stages with two pressure chambers arranged one above the other is described, for example, by W. Mink in "Grundzüge der Extrudertechnik," Verlag Rudolf Zechner, Speyer (1964), pages 84 ff. Also see German Utility Patent No. 68 11 768. This type of apparatus does not provide a satisfactory solution to the problem of continuously feeding a solid pulverulent or granular material into evacuated processing equipment.

One object of the present invention is to provide a substantially simplified method and apparatus for regulating the feed to evacuated screw extruders or similar processing apparatus. Another object of the invention is to avoid mechanically moving parts in the interior of the feed supply vessel or container from which the material flows into the feed zone of the screw extruder. Yet another object of the invention is to avoid as much as possible the contamination of the material in any working part such as valves or the like. Yet another object of the invention is to provide a process and apparatus for such continuous feed of a pulverulent or granular material whereby the feed can be rapidly initiated and then carried out automatically for relatively long periods with a minimum of disturbances. These and other objects and advantages of the invention will become more apparent upon consideration of the following detailed disclosure.

It has now been found, in accordance with the invention, that one can achieve an improved feed of a solid pulverulent or granular thermoplastic material into the feed zone of a continuously operated screw extruder by the steps which comprise continuously feeding the solid material downwardly, i.e., by gravity flow, from an enclosed intermediate supply zone which is in vacuumtight connection with the feed zone and is partially filled with a bed of the solid material, continuously evacuating the gas space above the bed in the intermediate supply zone, and intermittently conducting additional solid material flowing through a feed conduit into the intermediate supply zone from an external primary feed source maintained under approximately atmospheric pressure by initiating the flow of such additional material when the bed reaches a minimum height in the intermediate supply zone and terminating the flow of such additional material when the pressure in the gas space reaches a maximum value.

Especially suitable apparatus for this extrusion process or similar processes requiring the feed of a particulated material under vacuum is described in greater detail in conjunction with the accompanying drawing in which the single figure is a single feed container or intermediate supply vessel which is shown in partial cross section in combination with other elements of the feed apparatus shown in partly schematic form.

The feed container 1 is enclosed by a cover 2 which is provided with a pressure-sensitive switching device 3 in the form of a pressure gauge or the like in gaseous communication with the inner space of the container 1 by means of a connected conduit 3a. The lower portion of the container 1 is a funnel-shaped discharge section 4 in which a bed or layer of the particulated solid material is continuously maintained at varying levels throughout the feed operation. A filling gauge 5 is inserted near the lower end of this discharge section 4, using any suitable measuring element 5a which will monitor the height or level of the bed of granular or pulverulent material. In general, the bed will not rise higher than the top of the funnel-shaped discharge section 4. In the upper portion of the container 1, a tubular-shaped feed pipe or conduit 6 enters into the gas space inside of the container and is equipped with a suitable shutoff or gate valve 7 which can be opened or closed by means of a transmitted signal in order to regulate the supply of additional solid material from a primary feed source or large supply through conduit 13 under substantially atmospheric pressure. It should be noted that this valve 7 is either completely open or completely closed during the feed cycle and may therefore be characterized at a single-actuated on-off valve, preferably a solenoid valve.

The container 1 is evacuated in the usual manner by means of a vacuum pump 10 withdrawing gases or vapors through the exhaust conduit 9 protruding into the inner gas space of the container. This exhaust or suction conduit 9 preferably contains a self-cleaning filter 8, and there may be additionally inserted a pressure reservoir 11 between this filter 8 and the vacuum pump 10 in the exhaust conduit 9 (as indicated by broken lines). At the restricted end of the funnel-shaped discharge section 4 of the container 1, a diverging feed section 12 is fastened by suitable pressure-type connecting flanges to the feed stem or zone 18 of the screw extruder. At the narrowest portion of the container 1, the opening from section 4 into section 12 can be adjustably restricted by means of conventional sliding plates or the like within the boxed-in area 19, but it is preferable to avoid any mechanically moving parts within the container at least during the feeding operation.

During continuous operation, the valve 7 is actuated into its open position by a signal transmitted by the filling gauge 5 through line 14 to the control box 20 when the bed of solid material in section 4 reaches a minimum height at the lower tip of the measuring element 5a. On the other hand, valve 7 is actuated into a closed position by a signal transmitted from the pressure-sensitive switch 3 through line 15 to the control box 20 when the pressure within the gas space of container 1 reaches a maximum value. For reasons discussed below, each of the signal transmitting lines 14 and 15 preferably contains a circuit breaking means 16 and 17, respectively, for example in the form of a manually operated toggle switch.

In the embodiment of the invention illustrated in the drawing, both the pressure-sensitive switch 3 and the filling gauge 5 are constructed so as to transmit an electrical signal when the switches 17 and 16, respectively, are in a normally closed position. The magnetically operated solenoid valve 7 remains closed as long as the pressure-sensitive switch 3 has been actuated by a maximum pressure in the container 1. Then, as the bed or layer of solid material in the container falls to the lower end of the discharge section 4, the pressure in the container is substantially reduced below its maximum value by means of the vacuum pump 10. However, the gate valve 7 remains closed until the bed reaches a minimum height at which the filling gauge 5 is actuated to transmit a signal opening the gate valve 7 and permitting the inflow of fresh solid material with the container 1 being filled at a relatively rapid rate. In this respect, it is desirable for the feed conduits 13 and 6 to be sufficiently large so that the rate of flow of the pulverulent or granular solid material into the container 1 is much large than the discharge rate from the bottom of the container into the feed zone 18 of the screw extruder. The rate of discharge is of course dependent upon the rate at which the material is being processed in the screw extruder itself. It is preferable to provide a gate valve with an adjustable open position so that the feed inflow from an external source through conduit 13 can be regulated at a specific open position. Since the gas pressure gradually builds up in the container 1 during the inflow of fresh feed material, it is desirable to adjust the inflow feed rate such that the discharge section 4 of the container 1 is substantially filled at about the same time that a predetermined maximum pressure is reached in the container so as to actuate the pressure-sensitive switch 3 closing the valve 7. However, the discharge section 4 can be filled to intermediate levels before the valve 7 is closed, i.e., so as to provide a correspondingly more frequent on and off operation of the valve.

Thus, in the normal continuous operation of the filling device, the filling gauge 5 causes the valve to open at a predetermined minimum height of the bed of material in the discharge section 4 while the pressure-sensitive switch 3 closes the valve at a predetermined maximum pressure in the container 1. It will be understood that the valve remains open until closed by the switch 3 and likewise remains closed until opened in response to the filling gauge 5.

The pressure-sensitive switch 3 is most advantageously adjustable to different desired maximum pressures. For example, this switch can be in the form of a displaceable or adjustable switch contact located on the dial of an indicating pressure gauge. Thus, the switch contact can be positioned such that the indicator of the pressure gauge presses and closes the switch upon reaching the maximum pressure, i.e., turning the switch to its "on" position which is necessary to close the gate valve 7. It is also possible to employ a fluid pressure gauge, a diaphragm pressure gauge or an alphatron gauge, all of which can be equipped in a conventional manner with switching means or the like to emit an electrical signal upon reaching the desired maximum pressure. Instead of employing electrical signals, it is also feasible to transmit an impulse pneumatically through tubular conduits to the gate valve from the pressure responsive means 3.

A capacitive filling gauge 5 is employed in the illustrated embodiment. However, it is again possible to use any conventional type of gauge which is capable of measuring the level or filling height of a bed of pulverulent or granular solids and then transmitting an electric or pneumatic signal at a specific measured value representing the minumum height of the bed within the container. A wide variety of gauges are commercially available so that a detailed description is not necessary. It is especially preferred, however, to avoid the use of gauges which require mechanically moving parts within the interior of the container 1.

The value of the maximum pressure in the container which actuates the feed valve 7 to the closed position is the total pressure corresponding to the permissible gas and vapor content of the materials in the processing apparatus, particularly in the entry or feed chamber 18 of the screw extruder. For the satisfactory operation of a screw extruder or similar apparatus for the processing of pulverulent or granular materials, especially thermoplastic materials, it is generally advisable to work under a reduced pressure sufficient to withdraw volatile or vaporous components from the solid material. Thus, the maximum pressure in the entry zone 18 and the container 1 can be readily determined for any particular solid material being processed, it being understood that this maximum pressure is still substantially below atmospheric pressure. By means of the vacuumtight connection between the container 1 and the processing apparatus 18 as well as the provision of a continuously operating vacuum pump 10, the feed apparatus of the invention ensures the presence of a subatmospheric pressure in the container and the following portions of the processing apparatus throughout the entire operation.

It will be recognized that the container 1 is operated under a variable subatmospheric pressure between the maximum value set by the pressure-sensitive switch 3 and a minimum pressure which is dependent only upon efficiency of the vacuum pump connected to the container. In other words, the pressure fluctuates regularly during the overall filling operation, the pressure within the container being reduced while the valve 7 is closed and rising again when the valve 7 is open to permit the introduction of fresh solid material from an external feed source such as a large supply bin under normal atmospheric pressure. Surprisingly, the increase in pressure when the valve 7 is opened is sufficiently slow to permit a refilling of the container 1 with solid material before the pressure exceeds the maximum permissible value required in the processing apparatus.

The single feed container being operated under a reduced pressure in accordance with the invention may be described as a variable pressure feed vessel or reservoir having a continuous discharge and a discontinuous or periodic intake of the solid feed material.

The normal or continuous operation of the feed device according to the invention can be summarized as follows: upon reaching the adjusted or predetermined minimum height of the bed of material in the container 1, the gate valve 7 is opened in response to a control impulse or signal emitted from the filling gauge 5. Due to the vacuum in the inner space of the container 1, the pulverulent or granular material flows from the external feed source through conduits 13 and 6 into the container 1 where the solid material gives off a certain amount of gas and vapor carried along with it. Additional gases and vapors may also be generated in the screw extruder so as to be drawn back through the feed chamber 18 and upwardly into the open gas space in the upper portion of the container 1. The pressure in the container thus rises until reaching the maximum permissible pressure at which the pressure-sensitive switch 3 emits a separate control impulse or signal to close the gate valve 7.

The amounts of gas or vapors drawn into the upper portion of the container 1 are suctioned off by the vacuum pump which works without interruption. At the same time, solid material flows continuously to the extruder 18. Then, upon reaching the minimum height of the bed of solid material in the container 1, the gate valve 7 is again opened.

The time sequence for the intermittent filling or feeding periods from the external source to the container 1 depends primarily upon the permissible maximum and minimum pressures in the container and the exhaust capacity or efficiency of the vacuum pump. However, this time sequence also depends upon the volume of the container 1, the amount of gas given off from the thermoplastic or other solid material and especially the ratio of the feed rate of the solid material through feed conduit 6 to the discharge rate of material from the container as it is continuously processed in the screw extruder. This ratio of the intermittent feed rate to the continuous discharge rate of material flow can be expressed either as volume per unit time or weight per unit time. In general, this ratio should be at least about 5 and preferably more than 10.

In order to place the feed device of the invention into operation, i.e., before any solid material has been introduced into the container or intermediate feed vessel 1, the switches or circuit breakers 16 and 17 are placed in an open position to prevent any signals from being transmitted from the switch 3 or the gauge 5, the valve 7 being in a closed position. The empty container will then first be evacuated by starting the operation of the vacuum pump 10. After achieving a certain minimum pressure in the container 1 which must be sufficient to overcome any resistance to the flow of the pulverulent or granulated material being transported into the container, the switch 16 in the signal transmission line 14 between the filling gauge 5 and the valve 7 is closed, thereby opening the gate valve 7 and permitting an initial inflow of the thermoplastic or other solid material from an external feed bin or the like into the container so as to cover and provide a layer or bed of the solid material on the filling gauge measuring elements 5a. Once this measuring element 5a has been covered and preferably before the pressure reaches the maximum permissible value in the container 1, the other switch or circuit breaker 17 is closed in order to complete the circuit between the pressure-sensitive switch 3 and the valve 7 in the signal transmission line 15. The normal or continuous feeding steps then take place automatically as described above, the switches 16 and 17 remaining in their closed positions.

When it is desired to stop the operation of the entire apparatus, it is merely necessary to break the circuit in the signal transmission line 14 by opening the switch 16 so that the valve 7 remains closed and the pressure in the container 1 is maintained at the minimum value until the supply of the solid material has been exhausted. The vacuum pump 10 may then be turned off and the apparatus dismantled, e.g., for purposes of cleaning or for substituting a different solid material to be supplied through feed conduit 13.

The improved feed device and procedure according to the invention has a minimum space requirement and can be easily controlled during operation with a minimum of supervision. The absence of mechanically moving parts within the intermediate feed container substantially eliminates any disturbances in the continuous feed of pulverulent or granular material into the screw extruder. Also, since only one feed valve is required, contamination is substantially avoided. Although this improved feed device is generally applicable to the processing of any finely divided solids in the form of particles or granules maintained under a reduced pressure, it is especially adapted for use in combination with a screw extruder for the continuous extrusion of thermoplastic polymers into films, filaments, tubes or similar articles.

The invention is hereby claimed as follows:

1. A process for feeding a solid pulverulent or granular thermoplastic material into the feed zone of a continuously operated screw extruder, said process comprising:
    continuously feeding said solid material downwardly from an enclosed intermediate supply zone which is in vacuumtight connection with said feed zone and is partially filled with a bed of said solid material;
    continuously evacuating the gas space above said bed in said intermediate supply zone; and
    intermittently conducting additional solid material flowing through a feed conduit into said intermediate supply zone from an external primary feed source maintained under approximately atmospheric pressure by initiating the flow of such additional material when said bed reaches a minimum height in said intermediate supply zone and terminating the flow of such additional material when the pressure in said gas space reaches a maximum value.

2. In an apparatus for the processing of a flowable pulverulent or granular solid material which includes a feed chamber maintained under a vacuum, the improvement which comprises:
    a single feed container which is positioned above said feed chamber and which has a discharge outlet at the lower end thereof in vacuumtight connection with said feed chamber, said container being adapted to hold a bed of said solid material flowing downwardly into said feed chamber;
    vacuum pump means in gaseous connection with the inner space of said container above said bed of solid material to maintain said container and its associated feed chamber under a vacuum;
    a feed inlet conduit for said solid material connected to an upper portion of said container, said inlet conduit including a valve to regulate the supply of solid material to said container from an external feed source;
    filling gauge means projecting into said container and being in operative connection through a first signal transmission line for opening said valve when the bed of said solid material reaches a minimum height; and
    pressure responsive means arranged to sense the gas pressure in the inner space of said container and including a pressure-sensitive switch in operative connection through a second signal transmission line for closing said valve when the pressure of said inner space reaches a maximum value.

3. Apparatus as claimed in claim 2 wherein each of said signal transmission lines contains a circuit breaking means.

4. Apparatus as claimed in claim 2 wherein said container is shaped in the form of a funnel with downwardly converging sides and has a flanged discharge outlet connected to the feed chamber of the processing apparatus.

5. Apparatus as claimed in claim 2 wherein said pressure-sensitive switch is adjustable for actuation at different maximum pressures.

6. Apparatus as claimed in claim 2 wherein said pressure responsive means is a pressure gauge.

7. Apparatus as claimed in claim 2 wherein said valve is a solenoid operated gate valve.

* * * * *